March 24, 1931.  R. K. WINNING  1,797,745
CONTROL MECHANISM
Filed July 13, 1929
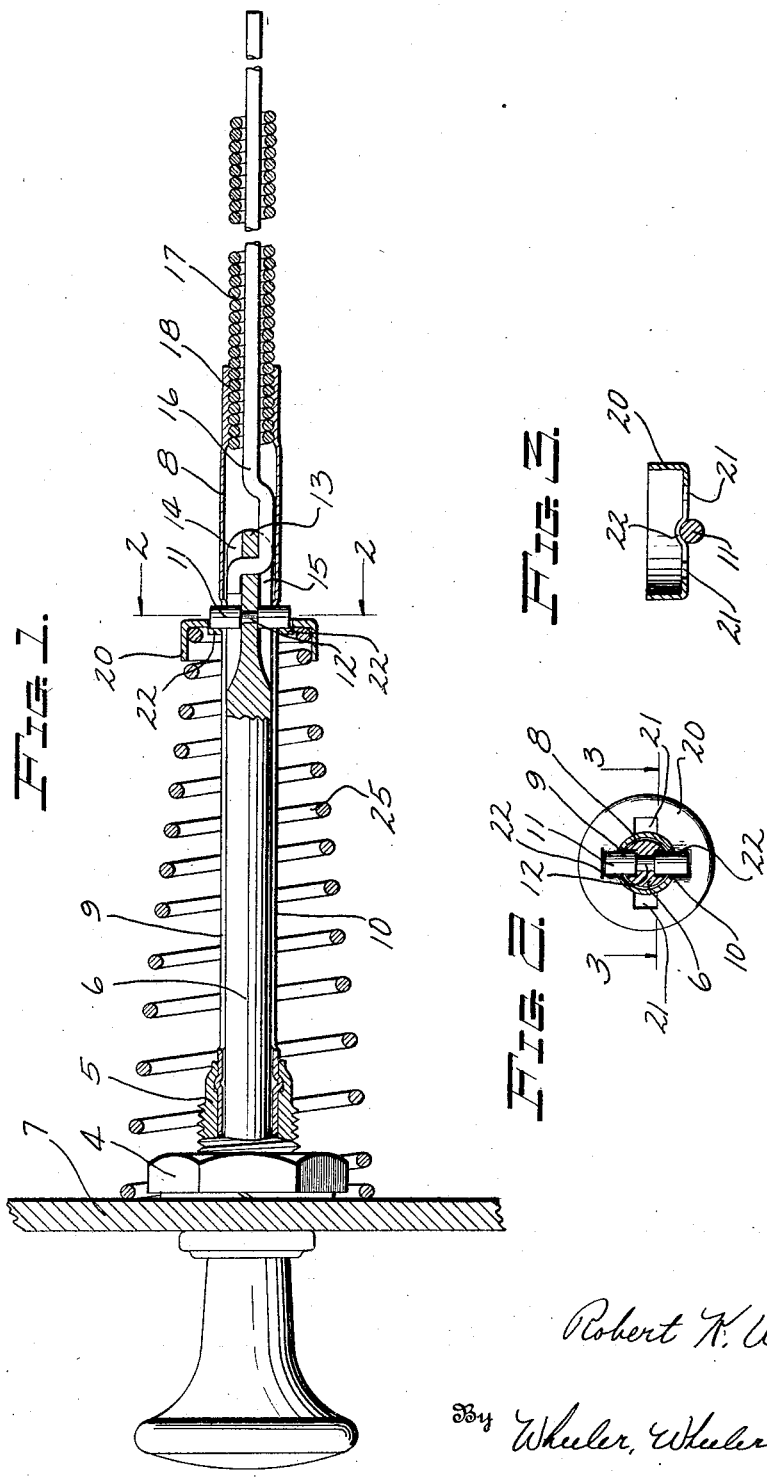
Inventor
Robert K. Winning
By Wheeler, Wheeler & Wheeler
Attorneys Patented Mar. 24, 1931

1,797,745

UNITED STATES PATENT OFFICE

ROBERT K. WINNING, OF WAUWATOSA, WISCONSIN, ASSIGNOR TO CLUM MANUFACTURING CO., OF MILWAUKEE, WISCONSIN, A CORPORATION OF WISCONSIN

CONTROL MECHANISM

Application filed July 13, 1929. Serial No. 378,119.

This invention relates to improvements in control mechanism of the type disclosed in my companion application entitled carbureter choke controls and executed of even date herewith.

It is the object of the invention to provide novel and improved means for the full return of a choke or like control mechanism following manual manipulation thereof.

More specifically stated it is my purpose to provide a control means in which an exteriorly accessible spring encircles the guide tube or mounting of the control member and transmits movement to the member through a specially designed co-acting spring seat and the guide pin for the member.

In the drawing:

Figure 1 is a diagrammatic illustration mostly in axial section, showing spring return control mechanism embodying this invention.

Figure 2 is a detail taken in section in the plane indicated at 2—2 in Fig. 1.

Figure 3 is a further detail in section taken in the plane indicated at 3—3 of Fig. 2.

Like parts are identified by the same reference characters throughout the several views.

The mounting 5 which carries the control member 6 from the dash 7 may comprise such a threaded bushing as that described in my co-pending application above referred to, with the exception that it need not contain any means for frictionally resisting movement of the control rod 6.

The tubular casing 8 is provided at 9 and 10 with upper and lower guide slots within which moves a special guide pin 11 riveted through an opening 12 in the end of rod 6 as clearly shown in Figs. 1 and 2. Beyond the rivet the web 13 between the upper and lower slots 14 and 15 of the rod is apertured to receive the extremity of the wire 16, this being bent as contemplated in my co-pending application Number 163,084, filed January 24, 1927. The flexible Bowden wire sheath 17 is anchored in suitable threads at 18 in the end of the anchorage casing 8.

Slidable on the outside of casing 8 is a cup-shaped spring seat member 20 having notches at 21 which, by manipulation of the spring seat, may be made to register with the ends of pin 11 to permit the assembly of the parts. After the spring seat has been manipulated past the ends of the pin it is turned 90° to present to such ends its recessed or indented portions 22 best shown in Figs. 1 and 3. Under pressure of the spring 25 the spring seat will be forced upon the ends of pin 11 which will enter recess 22 in such a way as to secure the spring seat against rotation to a position in which it could pass over the ends of the pin. In this position of the parts the pressure of the spring will be transmitted through spring seat 20 and pin 11 to the control member 6 and the wire 16 operated thereby.

It will be noted that the spring 25 is conical in outline, its larger end being of sufficient diameter to encircle the retaining nut 4 for the mounting 5. Thus the spring seats directly against the dash 7 while at the same time its spiral characteristic enables it to collapse very completely to accommodate a comparatively great movement of control member.

It is contemplated that when the control member is connected to carbureter choke or the like the range of movement of the control member will be sufficient to adjust the choke between its fully open and fully closed positions. In any event it will be observed that the spring acts upon the control member throughout its range of movement.

Needless to say the spring 25 is sufficiently strong to overcome any resistance involved in the movement of the control member to its retracted position when the choke control is manipulated by hand to flood the carbureter. It is, therefore, impossible for this flooded condition to obtain after the control member has been released by the operator. Immediately upon release spring 25 will return the parts to position shown in Fig. 1 in which the cross pin 11 is at the ends of the respective slots 9 and 10 in which it operates.

I claim:

1. In a device of the character described comprising the combination with a reciprocable control member, of a casing provided with a guide slot, a guide pin connected with said member and movable in said slot, and a spring arranged to act through said pin upon said member throughout the range of movement of said member in a direction to adjust said member to a retracted position.

2. In a device of the character described, the combination with a manually reciprocable control member, of a casing providing a guide slot, a guide pin connected with said member and projecting through said slot, a spring seat reciprocable upon the exterior of said casing and engaged with said pin, and an exterior spring encircling said casing and engaging said seat whereby to exert pressure through said pin upon said member.

3. In a device of the character described, the combination with a manually reciprocable control member, of a casing providing a guide slot, a guide pin connected with said member and projecting through said slot, a spring seat reciprocable upon the exterior of said casing and engaged with said pin, and an exterior spring encircling said casing and engaging said seat whereby to exert pressure through said pin upon said member, said spring having a spiral characteristic.

4. The combination with a panel, and a mounting therein, of a control member manually reciprocable through said mounting, a casing projecting rearwardly from said mounting, a nut holding said mounting to said panel, a spring seat operatively connected with said member, and a spring encircling said casing and abutting said panel exteriorly of said nut.

5. The combination with a panel, and a mounting therein, of a control member manually reciprocable through said mounting, a casing projecting rearwardly from said mounting, a nut holding said mounting to said panel, a spring seat operatively connected with said member, and a spring encircling said casing and abutting said panel exteriorly of said nut, said spring having a helical characteristic whereby the end thereof operatively connected with said member is small and the end thereof engaging the panel relatively large.

6. In a device of the character described, the combination with a control rod provided with a transversely extending guide pin, of a tubular casing for said rod provided with slots from which said pin projects, a spring seat guided upon the exterior of said casing and provided with opposing notches through which the ends of the pin are receivable, an intermediate recess adapted to confine the ends of the pin, and a compression spring operatively positioned to act through said seat and pin upon said rod.

7. A controlling device for automobiles, comprising a tubular member adapted to be secured to a support, a controlling rod reciprocably confined within said tubular member, a tension spring for said rod sleeved over said member, and means connecting said spring detachably to said parts.

8. A controlling device for automobiles, comprising a tubular member having means associated therewith to affix it to a support, a reciprocable rod extending through said member having a flexible operating element connected therewith, a coiled spring for retracting said rod, and means for detachably coupling one end of said spring to said rod.

9. A controlling device for automobiles, including a tubular member containing a reciprocable controlling rod and formed with a longitudinal slot, a pin on said rod extending through said slot, a collar connected detachably with said pin, and a coiled compression spring abutting against said collar.

10. A controlling device for automobiles, including a tube having a longitudinal slot, a reciprocable controlling rod within said tube having a projecting part extending through said slot, a notched member detachably connected with said projecting part, and a coiled compression spring sleeved over said tube and pressing against said member.

11. A controlling device for automobiles, including a slotted tube containing a reciprocable controlling rod having a pin projecting through the slot in the tube, a coiled spring and a collar sleeved on said tube, said collar having notches and depressions therein adapted to co-act with said pin to release or hold the spring.

12. A controlling device for automobiles, comprising an escutcheon member and means to secure the same upon a support, a slotted tube extending from said member having a flexible conduit attached thereto, a controlling rod reciprocably confined within said tube having a controlling wire connected therewith, extending through said conduit, said rod having a pin extending through said slot, a collar detachably connected with said pin, and a compression spring sleeved over said tube and pressing against said collar.

13. A controlling device for automobiles, comprising a tubular escutcheon member, a nut to secure said member upon a support, a slotted tube affixed to said member, a flexible conduit attached to said tube, a reciprocable rod within said tube having a wire connected therewith and extending through said conduit, a pin secured to said rod extending through the slot in said tube, a flanged collar having notches and depressions to secure the same detachably to said pin, and a coiled spring sleeved over said parts and nested at one end within said collar.

ROBERT K. WINNING.